US010167417B2

(12) United States Patent
Pieper et al.

(10) Patent No.: US 10,167,417 B2
(45) Date of Patent: Jan. 1, 2019

(54) QUANTUM DOT ARTICLE WITH REDUCED EDGE INGRESS AND IMPROVED COLOR STABILITY

(71) Applicant: 3M INNOVATIVE PROPERTIES COMPANY, St. Paul, MN (US)

(72) Inventors: Joseph M. Pieper, Minneapolis, MN (US); Eric W. Nelson, Stillwater, MN (US); Karrisa L. Eckert, Ham Lake, MN (US); Wayne S. Mahoney, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 32 days.

(21) Appl. No.: 15/323,661

(22) PCT Filed: Jun. 30, 2015

(86) PCT No.: PCT/US2015/038459
§ 371 (c)(1),
(2) Date: Jan. 3, 2017

(87) PCT Pub. No.: WO2016/003986
PCT Pub. Date: Jan. 7, 2016

(65) Prior Publication Data
US 2017/0158925 A1 Jun. 8, 2017

Related U.S. Application Data

(60) Provisional application No. 62/020,942, filed on Jul. 3, 2014.

(51) Int. Cl.
*C09J 163/00* (2006.01)
*C09K 11/02* (2006.01)
(Continued)

(52) U.S. Cl.
CPC .............. *C09J 163/00* (2013.01); *B32B 7/12* (2013.01); *B32B 27/06* (2013.01); *B32B 27/08* (2013.01);
(Continued)

(58) Field of Classification Search
CPC ... C09J 163/00; C09J 9/02; C09J 11/04; C09J 7/0203; C09J 5/06; C09K 11/025;
(Continued)

(56) References Cited

U.S. PATENT DOCUMENTS 7,374,807 B2    5/2008  Parce
7,645,397 B2    1/2010  Parce
(Continued)

FOREIGN PATENT DOCUMENTS

CN    101942073    1/2011
JP    S54-004992   1/1979
(Continued)

OTHER PUBLICATIONS

Hare, Protective Coatings: Fundamentals of Chemistry and Composition Technology, Epoxy Systems, 187-237 (1994).
(Continued)

*Primary Examiner* — William K Cheung
(74) *Attorney, Agent, or Firm* — Lisa P. Fulton

(57) ABSTRACT

A quantum dot film article including a first barrier layer, a second barrier layer; and a quantum dot layer between the first barrier layer and the second barrier layer. The quantum dot layer includes quantum dots dispersed in a matrix including a cured adhesive composition. The adhesive composition includes an epoxide and a curing agent including: (a) a compound of Formula I: wherein A is a monocyclic or a polycyclic alkylene group, or a monocyclic or a polycyclic heteroalkylene group, and m and n are integers each independently selected from 0 to 5; and (b) a polyether amine
(Continued)

compound including at least one of primary and secondary amino groups attached to a polyether backbone. The adhesive composition further includes a radiation curable methacrylate compound.

28 Claims, 4 Drawing Sheets

(51) Int. Cl.
  *B32B 7/12*   (2006.01)
  *B32B 27/06*  (2006.01)
  *B32B 27/08*  (2006.01)
  *B32B 27/36*  (2006.01)
  *B32B 27/38*  (2006.01)
  *C09J 5/06*   (2006.01)
  *C09J 9/02*   (2006.01)
  *C09J 11/04*  (2006.01)
  *C09K 11/08*  (2006.01)
  *C09J 7/35*   (2018.01)
  *G02F 1/13357* (2006.01)
  *G02F 1/1335*  (2006.01)
  *F21V 8/00*   (2006.01)

(52) U.S. Cl.
  CPC ............ *B32B 27/36* (2013.01); *B32B 27/38* (2013.01); *C09J 5/06* (2013.01); *C09J 7/35* (2018.01); *C09J 9/02* (2013.01); *C09J 11/04* (2013.01); *C09K 11/02* (2013.01); *C09K 11/025* (2013.01); *C09K 11/08* (2013.01); *G02F 1/1336* (2013.01); *B32B 2255/10* (2013.01); *B32B 2255/20* (2013.01); *B32B 2264/02* (2013.01); *B32B 2264/10* (2013.01); *B32B 2307/40* (2013.01); *B32B 2307/726* (2013.01); *B32B 2307/7244* (2013.01); *B32B 2307/7246* (2013.01); *B32B 2307/7265* (2013.01); *B32B 2457/20* (2013.01); *G02B 6/005* (2013.01); *G02B 6/0055* (2013.01); *G02F 1/133615* (2013.01); *G02F 2001/133614* (2013.01); *G02F 2202/36* (2013.01)

(58) Field of Classification Search
  CPC .......... B32B 7/12; B32B 27/08; B32B 27/38; B32B 27/36; B32B 2255/10; B32B 2264/02; B32B 2264/10; B32B 2307/40; B32B 2307/7246; B32B 2307/7265; B32B 2457/20; G02F 1/1336; G02F 2001/133614; G02B 6/0055; G02B 6/005
  USPC ................................................ 428/328, 343
  See application file for complete search history.

(56) References Cited

U.S. PATENT DOCUMENTS

| | | | |
|---|---|---|---|
| 8,013,052 B2 | 9/2011 | Nakamura | |
| 8,283,412 B2 | 10/2012 | Liu | |
| 8,343,575 B2 | 1/2013 | Dubrow | |
| 8,425,803 B2 | 4/2013 | Parce | |
| 8,592,037 B2 | 11/2013 | Parce | |
| 8,765,904 B2 | 7/2014 | Amey | |
| 2004/0242836 A1 | 12/2004 | Hayes | |
| 2005/0135079 A1* | 6/2005 | Yin Chua | B82Y 10/00 362/12 |
| 2011/0051047 A1 | 3/2011 | O'Neill | |
| 2012/0113672 A1 | 5/2012 | Dubrow | |
| 2013/0079435 A1 | 3/2013 | Raymond | |
| 2013/0255879 A1 | 10/2013 | Bieber | |
| 2013/0335677 A1 | 12/2013 | You | |

FOREIGN PATENT DOCUMENTS

| | | |
|---|---|---|
| JP | 2011-195841 | 10/2011 |
| KR | 10-2011-0120257 | 11/2011 |
| WO | WO 2012/064562 | 5/2012 |
| WO | WO 2014-113562 | 7/2014 |
| WO | WO 2015-095296 | 6/2015 |

OTHER PUBLICATIONS

International Search Report for PCT International Application No. PCT/US2015/038459, dated Oct. 20, 2015, 4pgs.

* cited by examiner

QUANTUM DOT ARTICLE WITH REDUCED EDGE INGRESS AND IMPROVED COLOR STABILITY

This application is a national stage entry of International Application (PCT) No. PCT/US2015/038459 filed Jun. 30, 2015, which claims priority to U.S. Provisional Patent Application No. 62/020,942 filed Jul. 3, 2014, all of which are incorporated by reference herein in their entirety.

BACKGROUND

Quantum dot film articles include quantum dots dispersed in a matrix that is laminated between two barrier layers. The quantum dot articles, which include combinations of green and red quantum dots as fluorescing elements, can enhance color gamut performance when used in display devices such as, for example, liquid crystal displays (LCDs).

Quantum dots are highly sensitive to degradation, so the quantum dot article should have excellent barrier properties to prevent ingress of, for example, water and oxygen. The barrier layers protect the quantum dots in the interior regions of the laminate construction from damage caused by oxygen or water exposure, but the cut edges of the article expose the matrix materials to the atmosphere. In these edge regions the protection of the quantum dots dispersed in the matrix is primarily dependent on the barrier properties of the matrix itself.

If water and/or oxygen enter the edge regions of the quantum dot article, the quantum dots on or adjacent to the exposed edge of the laminate construction can degrade and ultimately fail to emit light when excited by ultraviolet or visible light below the excitation wavelength of the quantum dots. This type of quantum dot degradation, referred to as edge ingress, can cause a dark line around a cut edge of the film article, which can be detrimental to performance of a display in which the quantum dot article forms a part.

SUMMARY

Slowing or eliminating quantum dot degradation along the laminate edges is particularly important to extend the service life of the displays in smaller electronic devices such as those utilized in, for example, handheld devices and tablets. However, in some electronic devices, a color change can be observed in the display following device aging. While users can tolerate some color variation as a result of quantum dot degradation or thermal/photo-enhancement as the display ages, some matrix materials that reduce edge ingress have shown unacceptable color change upon aging.

In general, the present disclosure is directed to matrix formulations for use in quantum dot articles. The matrix formulations resist ingress from water and/or oxygen, while also providing acceptable color stability upon aging. With the matrix in the current product, edge ingress of the converted parts is observed to exceed 1 mm after 100+ hours of accelerated aging. In various embodiments, the matrix materials described in this disclosure limit the edge ingress after aging in 65° C./95% RH or 85° C. conditions to less than 0.5 mm, and have a color change that does not exceed 0.02, or even 0.005, in both x and y from the initial measurement in the 1931 CIE coordinate system. These matrix formulations can extend the useful life of the quantum dot articles in display applications.

In one embodiment, the present disclosure is directed to a film article including a first barrier layer; a second barrier layer; and a quantum dot layer between the first barrier layer and the second barrier layer. The quantum dot layer includes quantum dots dispersed in a matrix including a cured adhesive composition. The adhesive composition includes an epoxide and a curing agent including: (a) a compound of Formula I:

$$H_2N\text{—}C_nH_{2n}\text{-}A\text{-}C_mH_{2m}\text{—}NH_2 \quad \text{Formula 1}$$

wherein A is a monocyclic or a polycyclic alkylene group, or a monocyclic or a polycyclic heteroalkylene group, and m and n are integers each independently selected from 0 to 5; and (b) a polyether amine compound including at least one of primary and secondary amino groups attached to a polyether backbone. The adhesive composition further includes a radiation curable methacrylate compound.

In another embodiment, the present disclosure is directed to a method of forming a film article. The method includes coating a quantum dot material on a first polymeric film including quantum dots in an adhesive composition. The adhesive composition includes an epoxide and a curing agent. The curing agent includes (a) an amino-functional compound of Formula I:

$$H_2N\text{—}C_nH_{2n}\text{-}A\text{-}C_mH_{2m}\text{—}NH_2 \quad \text{Formula I}$$

wherein A is a monocyclic or a polycyclic alkylene group, or a monocyclic or a polycyclic heteroalkylene group, and m and n are integers each independently selected from 0 to 5; and (b) a polyether diamine compound including at least one of primary and secondary amino groups attached to a polyether backbone. The backbone includes repeat units of propylene glycol (PG), ethylene glycol (EG), polytetramethylene glycol (PTMEG), and combinations thereof. The adhesive composition further includes a radiation curable methacrylate compound and a photoinitiator.

In yet another embodiment, the present disclosure is directed to an adhesive composition including an epoxide and a curing agent. The curing agent includes (a) an amino-functional compound of Formula I:

$$H_2N\text{—}C_nH_{2n}\text{-}A\text{-}C_mH_{2m}\text{—}NH_2 \quad \text{Formula I}$$

wherein A is a monocyclic or a polycyclic alkylene group, or a monocyclic or a polycyclic heteroalkylene group, and m and n are integers each independently selected from 0 to 5 and (b) a polyether diamine compound represented by Formula VI:

$$H_2N\text{—}R^{12}\text{—}(OR^{13})_p\text{—}NH_2 \quad \text{Formula VI}$$

wherein, in Formula VI, $R^{12}$ and $R^{13}$ are each independently a branched or linear alkylene having 1 to 4 carbon atoms, and p is equal to at least 2. The adhesive composition further includes a radiation curable methacrylate compound, a photoinitiator, and quantum dots.

In yet another embodiment, the present disclosure is directed to an adhesive composition including an epoxide and a curing agent. The curing agent includes a blend of: (a) an amino-functional compound of Formula I:

$$H_2N\text{—}C_nH_{2n}\text{-}A\text{-}C_mH_{2m}\text{—}NH_2 \quad \text{Formula I}$$

wherein A is a monocyclic or a polycyclic alkylene group, or a monocyclic or a polycyclic heteroalkylene group, and m and n are integers each independently selected from 0 to 5; and (b) a polyether diamine compound represented by Formula VI:

$$H_2N\text{—}R^{12}\text{—}(OR^{13})_p\text{—}NH_2 \quad \text{Formula VI}$$

wherein, in Formula VI, $R^{12}$ and $R^{13}$ are each independently a branched or linear alkylene having 1 to 4 carbon atoms, and p is equal to at least 2. The adhesive composition further includes a photoinitiator and quantum dots.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like symbols in the drawings indicate like elements.

DETAILED DESCRIPTION

Figure 1:
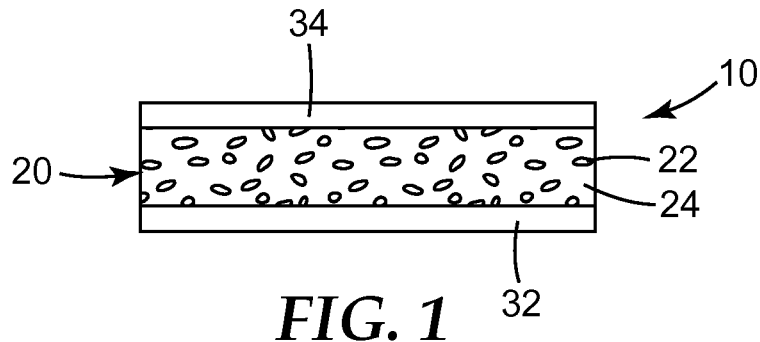
FIG. 1 is a schematic side elevation view of an edge region of an illustrative film article including quantum dots.

Referring to FIG. 1, an edge region of a quantum dot article 10 includes a first barrier layer 32, a second barrier layer 34, and a quantum dot layer 20 between the first barrier layer 32 and the second barrier layer 34. The quantum dot layer 20 includes a plurality of quantum dots 22 dispersed in a matrix 24.

The barrier layers 32, 34 can be formed of any useful material that can protect the quantum dots 22 from exposure to environmental contaminates such as, for example, oxygen, water, and water vapor. Suitable barrier layers 32, 34 include, but are not limited to, films of polymers, glass and dielectric materials. In some embodiments, suitable materials for the barrier layers 32, 34 include, for example, polymers such as polyethylene terephthalate (PET); oxides such as silicon oxide, titanium oxide, or aluminum oxide (e.g., $SiO_2$, $Si_2O_3$, $TiO_2$, or $Al_2O_3$); and suitable combinations thereof.

In some embodiments, each barrier layer 32, 34 of the quantum dot article 10 includes at least two sub-layers of different materials or compositions. In some embodiments, such a multi-layered barrier construction can more effectively reduce or eliminate pinhole defect alignment in the barrier layers 32, 34, providing a more effective shield against oxygen and moisture penetration into the matrix 24. The quantum dot article 10 can include any suitable material or combination of barrier materials and any suitable number of barrier layers or sub-layers on either or both sides of the quantum dot layer 20. The materials, thickness, and number of barrier layers and sub-layers will depend on the particular application, and will suitably be chosen to maximize barrier protection and brightness of the quantum dots 22 while minimizing the thickness of the quantum dot article 10. In some embodiments each barrier layer 32, 34 is itself a laminate film, such as a dual laminate film, where each barrier film layer is sufficiently thick to eliminate wrinkling in roll-to-roll or laminate manufacturing processes. In one illustrative embodiment, the barrier layers 32, 34 are polyester films (e.g., PET) having an oxide layer on an exposed surface thereof.

The quantum dot layer 20 can include one or more populations of quantum dots or quantum dot materials 22. Exemplary quantum dots or quantum dot materials 22 emit light when excited by ultraviolet or visible light below the excitation wavelength of the quantum dots. In some embodiments, for example, the quantum dot materials 22 emit green light and red light upon down-conversion of blue primary light from a blue LED to secondary light emitted by the quantum dots. The respective portions of red, green, and blue light can be controlled to achieve a desired white point for the white light emitted by a display device incorporating the quantum dot article 10. Exemplary quantum dots 22 for use in the quantum dot articles 10 include, but are not limited to, CdSe with ZnS shells. Suitable quantum dots for use in quantum dot articles described herein include, but are not limited to, core/shell luminescent nanocrystals including CdSe/ZnS, InP/ZnS, PbSe/PbS, CdSe/CdS, CdTe/CdS or CdTe/ZnS. In exemplary embodiments, the luminescent nanocrystals include an outer ligand coating and are dispersed in a polymeric matrix. Quantum dot and quantum dot materials 22 are commercially available from, for example, Nanosys Inc., Milpitas, Calif. The quantum dot layer 20 can have any useful amount of quantum dots 22, and in some embodiments the quantum dot layer 20 can include from 0.1 wt % to 1 wt % quantum dots, based on the total weight of the quantum dot layer 20.

In some embodiments, the quantum dot materials can include quantum dots dispersed in a liquid carrier. For example, the liquid carrier can include an oil such as an amino-silicone oil, which can also scatter light.

In one or more embodiments the quantum dot layer 20 can optionally include scattering beads, particles or emulsions that scatter light. In various embodiments, these scattering beads, particles and emulsions have a refractive index that differs from the refractive index of the matrix material 24 by at least 0.05, or by at least 0.1. The scattering beads, particles and emulsions can include, for example, polymers such as silicone, acrylic, nylon, and the like, or inorganic materials such as $TiO_2$, $SiO_x$, $AlO_x$, and the like, and combinations thereof. In some embodiments, including scattering particles in the quantum dot layer 20 can increase the optical path length through the quantum dot layer 20 and improve quantum dot absorption and efficiency. In many embodiments, the scattering beads or particles have an average particle size from 1 to 10 micrometers, or from 2 to 6 micrometers. In some embodiments, the quantum dot material 20 can optionally include fillers such fumed silica.

The matrix 24 of the quantum dot layer 20 can be formed from an adhesive that effectively adheres to the materials forming the barrier layers 32, 34 to form a laminate construction, and also forms a protective matrix for the quantum dots 22. In one embodiment, the matrix 24 is formed by curing or hardening an adhesive composition including an epoxy amine polymer and an optional radiation-curable methacrylate compound.

The epoxy amine polymer is a reaction product of an epoxide and an amino-functional curing agent, and adheres to a wide variety of barrier materials 32, 34.

Suitable epoxides include epoxy resins with a bisphenol A backbone or a bisphenol F backbone, and in some embodiments the epoxides are multifunctional. Suitable examples of epoxides for using in the adhesive composition include, but are not limited to, diepoxides available from Momentive Specialty Chemicals, Columbus, Ohio, under the trade designations EPON 824 (bisphenol A backbone) and EPON 862 (bisphenol F backbone). Some epoxides with a bisphenol F backbone have been found to have superior barrier properties compared to epoxides with a bisphenol A backbone. While not wishing to be bound by any theory, presently available evidence indicates that the bisphenol F backbone is more compact and includes fewer substituents than the bisphenol A backbone, which can allow the bisphenol F epoxides to pack more closely together when forming a component of the matrix material 24, which can in some cases slow the ingress of water and oxygen.

The amino-functional curing agent includes at least two amino-functional compounds. The first amino-functional compound has a non-aromatic, cyclic aliphatic backbone, particularly those containing at least two amino groups connected to a cycloaliphatic ring or ring-system. In some embodiments, the first amino-functional compound is represented by Formula I:

$$H_2N-C_nH_{2n}-A-C_mH_{2m}-NH_2 \qquad \text{Formula I}$$

wherein A is either a monocyclic or polycyclic alkylene group, or a monocyclic or polycyclic heteroalkylene group, and m and n are integers. In Formula I, m and n are each independently selected in the range from 0 to 5, or 1 to 5. The term alkylene group as used herein refers to a bivalent radical formed by removing a hydrogen atom from each of two different carbon atoms on a monocyclic or a polycyclic alkyl compound. The mono- or polycyclic alkyl can include a single ring, two rings, three rings, or multiple rings.

In various non-limiting embodiments, the monocyclic or polycyclic alkylene A groups can have up to 20 carbon atoms, up to 16 carbon atoms, up to 14 carbon atoms, up to 12 carbon atoms, up to 10 carbon atoms, or up to 7 carbon atoms. In various non-limiting embodiments, the monocyclic or polycyclic heteroalkylene A groups have up to 20 carbon atoms and up to 4 heteroatoms, up to 16 carbon atoms and up to 4 heteroatoms, up to 12 carbon atoms and up to 3 heteroatoms, or up to 10 carbon atoms and up to 3 heteroatoms. The heteroatoms are selected from oxygen, sulfur, nitrogen, or a combination thereof.

Non-limiting examples of A groups in Formula I are polycyclic alkylene groups having one or more bicyclo (2.2.1) heptane rings such as those described in Japanese Patent Application Kokai Publication S54004992. Groups of this type are represented by the following Formulas II and III:

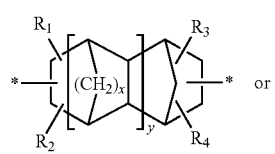

Formula II

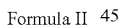

or

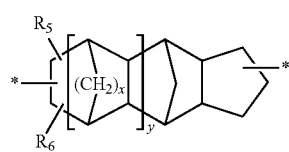

Formula III

wherein $R_1$, $R_2$, $R_3$, $R_4$, $R_5$ and $R_6$ each represent either a hydrogen or a methyl group; and x and y each represent either 0 or 1. The asterisks (*) in Formulas II and III represent the positions where the polycyclic alkylene group A attaches to the amino or alklyamino groups in Formula I.

Specific examples of the first amino-functional compound including the groups represented by the general Formulas II and III are, 3(or 4), 8(or 9)-diaminomethyltricyclo(5,2,1, $0^{2.6}$) decane,

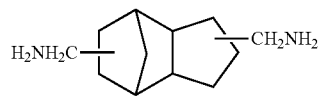

4,9(or 10)-diaminomethyltetracyclo(6,2,1,$1^{3.6}$,$0^{2.7}$) dodecane,

and 2,5(or 6)-diaminomethyl bicyclo(2,2,1)heptane.

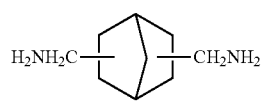

Diaminomethyl tricyclodecane is an example of a first amino-functional compound in the amino-functional curing agent. Other compounds suitable as the first amino-functional compound include, but are not limited to, isophorone diamine (IPDA), 1,3-cyclohexanebis(methylamine), and 1,4-bis(3-aminopropyl) piperazine. A suitable first amino-functional compound is available from Oxea Corp., Dallas, Tex., under the trade designation TCD-diamine, particularly octahydro-4,7-methano-1H-indenedimethylamine (which is also referred to as 3(or 4), 8(or 9)-diaminomethyltricyclo(5, 2,1,$0^{2.6}$) decane). Again, while not wishing to be bound by any theory, presently available evidence indicates that the compact nature of the cyclic backbone can create more compact structures that pack closely together when forming the matrix material 24, which can in some cases slow ingress of water and oxygen.

The second amino-functional compound in the amino-functional curing agent is a polyether amine compound. In various non-limiting embodiments, suitable amines are polyether amines that contain primary and/or secondary amino groups, particularly terminal primary and/or secondary amino groups, attached to a polyether backbone. The polyether backbone can be based on repeat units of propylene glycol (PG), ethylene glycol (EG), mixed EG/PG, polytetramethylene glycol (PTMEG), and combinations thereof. Polyether amines having this core structure can be monoamines, diamines, or triamines.

Suitable polyether amines are represented by the following Formula IV.

$$R^7-(NHR^8)_y \qquad \text{Formula IV}$$

In Formula IV, the group $R^7$ is a monovalent, divalent or trivalent polyether radical having at least 2, at least 3, at least 5, at least 10, at least 20, or at least 30 groups of formula $-(R^9-O)-$, where $R^9$ is a linear or branched alkylene having 1 to 4 carbon atoms, 2 to 4 carbon atoms or 2 to 3 carbon atoms. The group $R^8$ is hydrogen or alkyl (e.g., an alkyl having 1 to 10 carbon atoms, 1 to 6 carbon atoms, or 1 to 4 carbon atoms). The variable y is equal to 1, 2, or 3. The weight average molecular weight can be up to 5,000 grams/mole, up to 4,000 grams/mole, up to 3,000 grams/mole, up to 2,000 grams/mole, up to 600 grams/mole, or up to 300 gram/mole. The weight average molecular weight is often at least 100 grams/mole, at least 120 grams/mole, at least 150 grams/mole, or at least 200 grams/mole.

In some embodiments, the polyether amine of Formula IV is a polyether monoamine of the following Formula V.

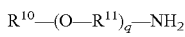
$$R^{10}-(O-R^{11})_q-NH_2 \quad \text{Formula V}$$

In Formula V, the group $R^{10}$ is an alkyl having 1 to 4 carbon atoms, 1 to 3 carbon atoms or 1 carbon atom. Each group $R^{11}$ is independently a branched or linear alkylene having 1 to 4 carbon atoms, 2 to 4 carbon atoms, or 2 to 3 carbon atoms. The variable q is equal to at least 2, at least 3, at least 5, or at least 10, at least 20, or at least 30. Examples of suitable monoamines of Formula V are commercially available from Huntsman Corporation (Woodlands, Tex.) under the trade designation JEFFAMINE such as those in the JEFFAMINE M-series (e.g., M-600, M-1000, M-2005, and M-2070).

In other embodiments, the polyether amine of Formula IV is a polyether diamine of the following Formula VI.

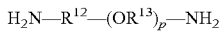
$$H_2N-R^{12}-(OR^{13})_p-NH_2 \quad \text{Formula VI}$$

In Formula VI, each group $R^{12}$ and $R^{13}$ is each independently a branched or linear alkylene having 1 to 4 carbon atoms, 2 to 4 carbon atoms, or 2 to 3 carbon atoms. The variable p is equal to at least 2, at least 3, at least 5, at least 10, at least 20, or at least 30. Examples of suitable diamines of Formula VI are commercially available from Huntsman Corporation (Woodlands, Tex.) under the trade designation JEFFAMINE such as those in the JEFFAMINE D-series (e.g., D-230, D400, D-2000, and D-4000), JEFFAMINE HK-511, the JEFFAMINE ED-series (e.g., ED-600, ED-900, and ED-2003), the JEFFAMINE EDR series (e.g., EDR-148, and EDR-176), or the JEFFAMINE THF series (e.g., THF-100, THF-140, and THF-170). Other examples of suitable diamines of Formula VI are commercially available from BASF (Florham Park, N.J.) under the trade designation BAXXODUR (e.g., BAXXODUR EC-130 (4,7,10-trioxatridecane-1,13-diamine), EC-280 (4,9-dioxadodecane-1,12-diamine), EC 301, EC 302 (poly(propylene glycol) bis(2-aminopropyl ether)), and EC 303.

In still other embodiments, the polyether amine is a polyether triamine such as those commercially available from Huntsman Corporation (Woodlands, Tex.) under the trade designation JEFFAMINE, such as those in the JEFFAMINE T-series (e.g., T-403, T-3000, and T-5,000) and from BASF (Florham Park, N.J.) under the trade designation BAXXODUR (e.g., BAXXODUR (e.g., BAXXODUR EC 110, EC 310, and EC 311).

In yet other embodiments, the polyether amine is a polyether diamine or polyether triamine having secondary amine groups. These polyether amines are commercially available, for example, from Huntsman Corporation (Woodlands, Tex.) under the trade designation JEFFAMINE such as those in the JEFFAMINE SD-series or ST-series (SD-213, SD-401, SD-2001, and ST-404).

The first and the second amino-functional compounds can be combined in any amounts to make the amino-functional curing agent. In various embodiments, typical ratios by weight of the first amino-functional compound to the second amino-functional compound may be from about 1:1 to about 10:1, or about 1:1 to about 1:5, or about 1:1 to about 1:3. In other embodiments, the ratios by weight of the first amino-functional compound to the second amino-functional compound may be from about 10:1 to about 1:1, or about 5:1 to about 1:1, or about 3:1 to about 1:1.

Optionally, the first and second amines may be adducted to a multifunctional epoxy resin by pre-reacting excess amine with some of the epoxy resin, as described by Clive H. Hare in *Protective Coatings: Fundamentals of Chemistry and Composition* Technology Publishing Company, Pittsburgh, Pa. (ISBN 0-938477-90-0) Chapter 15-*Epoxy Systems*, pp 187-237. The resulting adducts are essentially high molecular weight amines with epoxy backbones.

The epoxy amine polymer is formed by thermal polymerization of one or a combination of the amine-functional curing agents described above, and one or a combination of the epoxide materials described above. In various embodiments, the epoxy to amine ratios in this reaction range stoichiometrically from about 0.6 to about 1.4 epoxy to amine hydrogen, or about 0.8 to about 1.2 epoxy to amine hydrogen. In some embodiments, the refractive index of the epoxy amine polymer resulting from this reaction is in about 1.48 to about 1.60, or from about 1.50 to about 1.57. In some embodiments, the higher refractive index can improve scattering when low refractive index particles or light scattering emulsions are used, which can result in a longer optical path length and improved quantum dot efficiency. Conjugation in high refractive index materials also decreases the water vapor and oxygen transport rates within the matrix 24.

In various embodiments, the epoxy amine polymer forms about 70 wt % to about 100 wt %, or about 70 wt % to about 90 wt %, or about 75 wt % to about 85 wt %, of the adhesive composition, based on the total weight of the adhesive composition.

Due to the fast Michael addition of acrylates, in some embodiments methacrylates are used in the adhesive composition to preserve the working time of the epoxy amine polymer system in the adhesive composition. In some embodiments, the radiation curable methacrylate compound can increase the viscosity of the adhesive composition and can reduce defects that would otherwise be created during the thermal acceleration of the epoxy amine. Useful radiation curable methacrylate compounds have barrier properties to minimize the ingress of water and/or oxygen. In some embodiments, methacrylate compounds with a glass transition temperature ($T_g$) of greater than about 100° C. and substituents capable of forming high crosslink densities can provide a matrix with improved gas and water vapor barrier properties. In some embodiments, the radiation curable methacrylate compound is multifunctional, and suitable examples include, but are not limited to, those available under the trade designations SR 348 (ethoxylated (2) bisphenol A dimethacrylate), SR540 (ethoxylated (4) bisphenol A dimethacrylate), and SR239 (1,6-hexane diol dimethacrylate) from Sartomer USA, LLC, Exton, Pa.

The methacrylate compound forms about 0 wt % to about 25 wt %, or about 5 wt % to about 25 wt % or about 10 wt % to about 20 wt %, of the adhesive composition. In some embodiments, if the methacrylate polymer forms less than 5 wt % of the adhesive composition, the methacrylate compound does not adequately increase the viscosity of the adhesive composition to provide the adhesive composition with a sufficient working time.

In some embodiments, the adhesive composition optionally includes about 0.1 wt % to about 10 wt % of a photoinitiator, based on the total weight of the adhesive composition. A wide variety of photoinitiators may be used, and suitable examples include, but are not limited to, those available from BASF Resins, Wyandotte, Mich., under the trade designations IRGACURE 1173, IRGACURE 4265, IRGACURE 819, LUCIRIN TPO, LUCIRIN TPO-L, and DAROCUR 4265.

Figure 2:
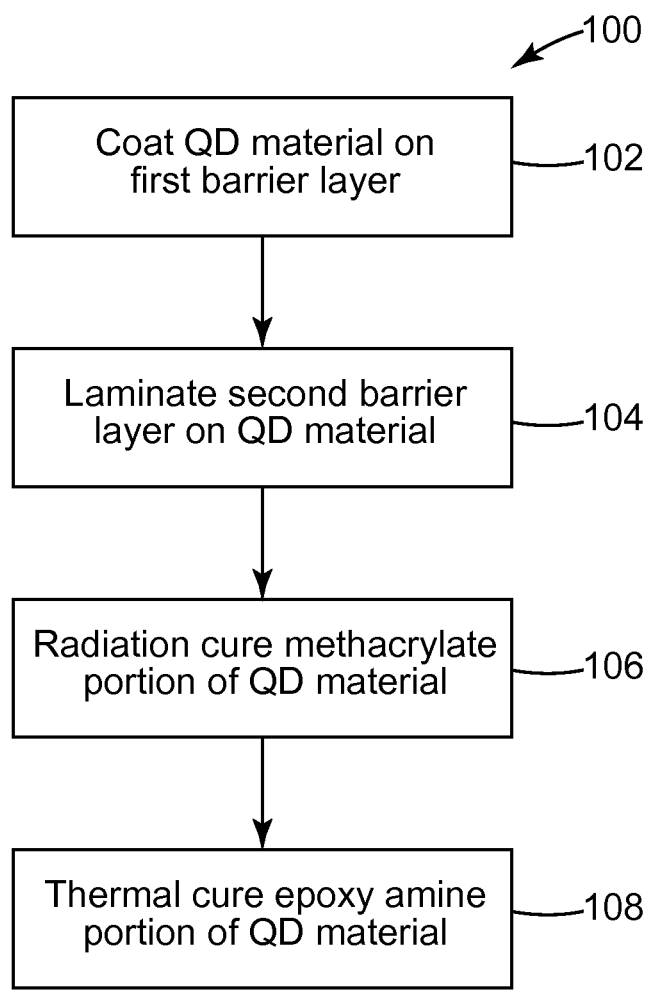
FIG. 2 is a flow diagram of an illustrative method of forming a quantum dot film.

Referring to FIG. 2, in another aspect, the present disclosure is directed to a method of forming a quantum dot film article 100 including coating an adhesive composition including quantum dots on a first barrier layer 102 and disposing a second barrier layer on the quantum dot material 104. In some embodiments, the method 100 includes polymerizing (e.g., radiation curing) the radiation curable methacrylate compound to form a partially cured quantum dot material 106 and polymerizing (e.g., thermal curing) the epoxide and the amino-functional curing agent of the partially cured quantum dot material to form a cured matrix 108.

In some embodiments, the adhesive composition can be cured or hardened by heating to a temperature of about 50° C. to about 120° C. In other embodiments, the adhesive composition may also be cured or hardened by applying radiation such as, for example, ultraviolet (UV) or visible light. Curing or hardening steps may include UV curing, heating, or both. In some example embodiments that are not intended to be limiting, UV cure conditions can include applying about 10 mJ/cm$^2$ to about 4000 mJ/cm$^2$ of UVA, more preferably about 10 mJ/cm$^2$ to about 200 mJ/cm$^2$ of UVA. Heating and UV light may also be applied alone or in combination to increase the viscosity of the adhesive composition, which can allow easier handling on coating and processing lines.

In some embodiments, the adhesive composition may be cured after lamination between the overlying barrier films 32, 34. Thus, the increase in viscosity of the adhesive composition locks in the coating quality right after lamination. By curing right after coating or laminating, in some embodiments the cured methacrylate polymer increases the viscosity of the adhesive composition to a point that the adhesive composition acts as a pressure sensitive adhesive (PSA) to hold the laminate together during the thermal cure of the epoxy amine and greatly reduces defects during a cure of the epoxy amine. In some embodiments, the radiation cure of the methacrylate compound of the adhesive composition provides greater control over coating, curing and web handling as compared to traditional thermal curing of an epoxy only laminating adhesive composition.

Once at least partially cured, the adhesive composition forms an interpenetrating polymer network that provides a protective supporting matrix 24 for the quantum dots 22. In this application the term interpenetrating polymer network refers to a combination of two or more polymers in network form that are synthesized in juxtaposition. In various embodiments, the cured supporting matrix 24 includes about 70 wt % to about 100 wt %, about 70 wt % to about 90 wt %, or about 75 wt % to about 85 wt %, of the epoxy amine polymer. In various embodiments, the cured supporting matrix 24 includes about 0 wt % to about 25 wt %, about 5 wt % to about 25 wt %, or about 10 wt % to about 20 wt %, of the methacrylate polymer.

Edge ingress is defined by a loss in quantum dot performance due to ingress of moisture and/or oxygen into the matrix 24. In various embodiments, the edge ingress of moisture and oxygen into the cured matrix 24 is less than about 1.0 mm after 1 week at 85° C., or about less than 0.75 mm after 1 week at 85° C., or less than about 0.5 mm after 1 week at 85° C. In various embodiments, oxygen permeation into the cured matrix is less than about 80 (cc.mil)/(m$^2$ day), or less than about 50 (cc.mil)/(m$^2$ day). In various embodiments, the water vapor transmission rate of the cured matrix should be less than about 15 (20 g/m$^2$.mil.day), or less than about 10 (20 g/m$^2$.mil.day).

In various embodiments, the color change observed upon aging is defined by a change of less than 0.02 on the 1931 CIE (x,y) Chromaticity coordinate system following an aging period of 1 week at 85° C. In certain embodiments, the color change upon aging is less than 0.005 on the following an aging period of 1 week at 85° C.

In various embodiments, the thickness of the quantum dot layer 20 is about 40 microns to about 400 microns, or about 80 microns to about 250 microns.

Figure 3:
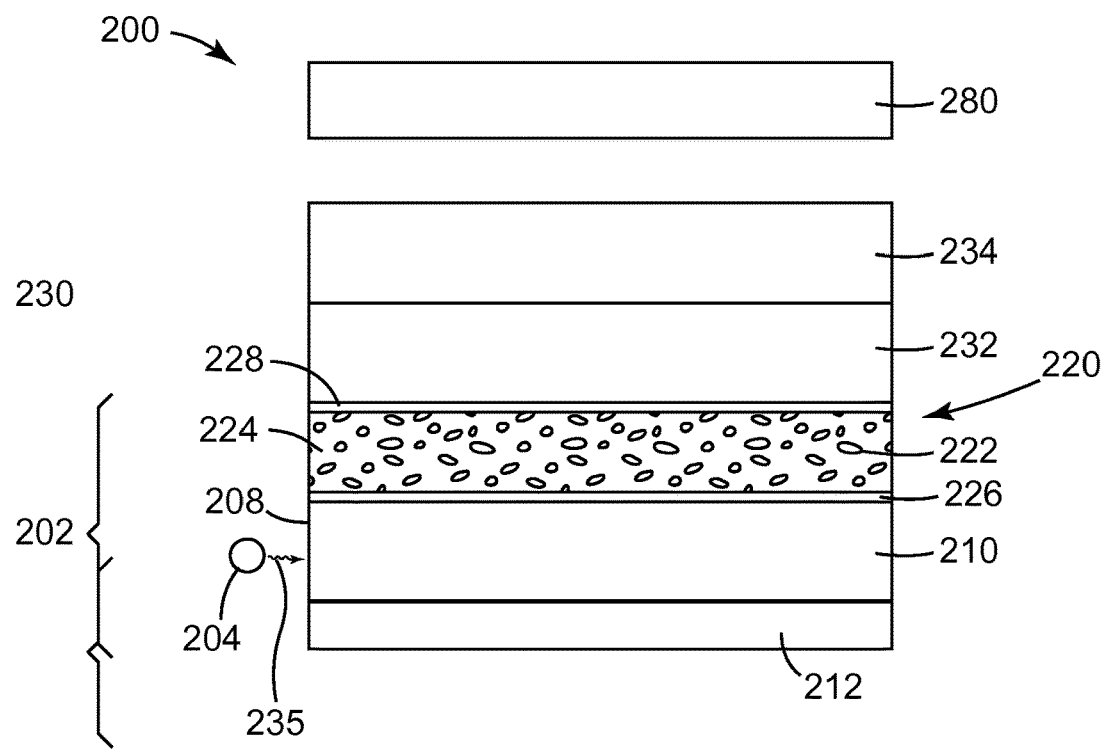
FIG. 3 is a schematic illustration of an embodiment of a display including a quantum dot article.

FIG. 3 is a schematic illustration of an embodiment of a display device 200 including the quantum dot articles described herein. This illustration is merely provided as an example and is not intended to be limiting. The display device 200 includes a backlight 202 with a light source 204 such as, for example, a light emitting diode (LED). The light source 204 emits light along an emission axis 235. The light source 204 (for example, a LED light source) emits light through an input edge 208 into a hollow light recycling cavity 210 having a back reflector 212 thereon. The back reflector 212 can be predominately specular, diffuse or a combination thereof, and is preferably highly reflective. The backlight 202 further includes a quantum dot article 220, which includes a protective matrix 224 having dispersed therein quantum dots 222. The protective matrix 224 is bounded on both surfaces by polymeric barrier films 226, 228, which may include a single layer or multiple layers.

The display device 200 further includes a front reflector 230 that includes multiple directional recycling films or layers, which are optical films with a surface structure that redirects off-axis light in a direction closer to the axis of the display, which can increase the amount of light propagating on-axis through the display device, this increasing the brightness and contrast of the image seen by a viewer. The front reflector 230 can also include other types of optical films such as polarizers. In one non-limiting example, the front reflector 230 can include one or more prismatic films 232 and/or gain diffusers. The prismatic films 232 may have prisms elongated along an axis, which may be oriented parallel or perpendicular to an emission axis 235 of the light source 204. In some embodiments, the prism axes of the prismatic films may be crossed. The front reflector 230 may further include one or more polarizing films 234, which may include multilayer optical polarizing films, diffusely reflecting polarizing films, and the like. The light emitted by the front reflector 230 enters a liquid crystal (LC) panel 280. Numerous examples of backlighting structures and films may be found in, for example, Publication No. US 2011/0051047.

Various embodiments are provided that are a film, method, or adhesive composition.

Some of the advantages of the quantum dot film articles are further illustrated by the following examples. The particular materials, amounts and dimensions recited in these examples, as well as other conditions and details, should not be construed to unduly limit the present disclosure.

EXAMPLES

Materials Used

EPON 824: Bisphenol A backbone epoxy resin available from Momentive Specialty Chemicals (Columbus, Ohio).
EPON 828: Bisphenol A diglycidyl ether available from Momentive Specialty Chemicals (Columbus, Ohio).
EPON 862: Bisphenol F backbone epoxy resin available from Momentive Specialty Chemicals (Columbus, Ohio).
EPIC RESINS Epoxy Resin RM12B4791B: blend of TTD Diamine pre-reacted with Bisphenol A diglycidyl ether (BPADGE) (available from Epic Resins, Palmyra, Wis.).

R1964-01: Red quantum dot concentrate (available from Nanosys Corp., Palo Alto Calif.).
G1964-01: Green quantum dot concentrate (available from Nanosys Corp., Palo Alto Calif.).
SR348: Bisphenol-A dimethacrylate from Sartomer USA, LLC (Exton, Pa.).
DAROCUR 4265—Photoinitiator available from BASF Resins (Wyandotte, Mich.).
2 mil barrier film—available as FTB3-M-125 from 3M Company (St. Paul Minn.).
TCD Diamine—3(4),8(9)-Bis(aminomethyl)-tricyclo[5.2.1.0(2.6)]decane [68889-71-4] available from Oxea Corporation (Dallas, Tex.).
TTD Diamine—BAXXODUR EC 130, 4,7,10-trioxatridecan-1,13,-diamine, available from BASF, Florham Park, N.J.
Silicone Release Liner UV-10—available from CP Films, Inc. (Martinsville, Va.).

Figure 4:
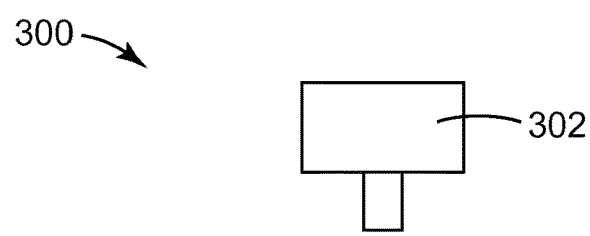
FIG. 4 is a schematic illustration of a white point measurement system.
Figure 4:
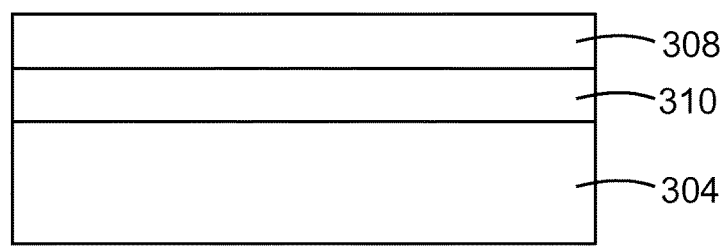

Color was quantified by placing the constructed film 310 into a recycling system 300 (FIG. 4) and measuring with a colorimeter 302 available from Photo Research, Inc., Chatsworth, Calif., under the trade designation PR650. A gain cube 304 with a blue LED light was used with the film 310, which contained red and green quantum dots, and a microreplicated brightness enhancement film 308 available from 3M, St. Paul, Minn., under the trade designation VIKUITI BEF. A white point was achieved in this recycling system.

Color was measured: (1) after a duration of operation in the blue light recycling system 300 of FIG. 4; (2) after a duration of use at 65° C./95% RH, and (3) after a duration of use at 85° C.

An initial white point after film construction was measured and quantified using the CIE1931 (x,y) convention. It is ideal for QDEF to maintain the same color during long-term operation. Most of the photo-enhancement was observed in the first 10-20 hours in a device or aging at 85° C. The effect was irreversible.

Edge ingress was quantified using a ruler and microscope while using a UV back light to illuminate active quantum dots.

Example 1

A quantum dot enhancement film was constructed as shown in FIG. 1. A matrix formulation was mixed prior to coating and then used to laminate two barrier films, encapsulating the matrix.

The matrix included Part A, a Part B, red quantum dot concentrate, and green quantum dot concentrate.

Part A included bisphenol-A diglycidyl ether (EPON 828) (80±10 wt %), bisphenol-A dimethacrylate (SR 348) (balance), and a photo-initiator (DAROCUR 4265) (<1 wt %) that will absorb in the UV-A range.

Part B included an amine (4,7,9)-trioxatridecane-1,13-diamine (TTD Diamine) that has been pre-reacted with some bisphenol-A diglycidyl ether (EPON 828) to raise the viscosity to 1000-3000 cP (25° C.).

The separate matrix components were mixed into an homogeneous slurry. The matrix slurry was (1) applied to the barrier film at a 100±10 μm, (2) laminated with another barrier film in an inert environment, (3) exposed to UV-A radiation, and (4) thermally cured at elevated temperature of 260° F. (125° C.) for 8 minutes.

As shown in Table 1 below and FIGS. 5-7, this construction exhibited high quantum dot efficiency, long lifetime, and acceptable color-stability upon aging.

Example 2

A quantum dot enhancement film was constructed as shown in FIG. 1. A matrix formulation was mixed prior to coating and then used to laminate two barrier films, encapsulating the matrix.

The matrix included Part A, a Part B, red quantum dot concentrate, and green quantum dot concentrate.

Part A included bisphenol-F diglycidyl ether (EPON 862) (80 wt %), a bisphenol-A dimethacrylate (SR 348) (20 wt %), and a photo-initiator (DAROCUR 4265) (<1 wt %) that will absorb in the UV-A range.

Part B included a tricyclodecane diamine (TCD Diamine) that had been pre-reacted with some bisphenol-F diglycidyl ether (EPON 862) to raise the viscosity to 1000-3000 cP (25° C.).

Example 3

A quantum dot enhancement film was constructed as shown in FIG. 1. A matrix formulation was mixed prior to coating and then used to laminate two barrier films, encapsulating the matrix.

The matrix included Part A, a Part B, red quantum dot concentrate, and green quantum dot concentrate.

Part A was identical in composition to Part A of Example 2:

| Material | Approximate wt % |
| --- | --- |
| Epon862 (BPFDGE) | 79 |
| SR348 | 20 |
| Darocur4265 | 1 |

Part B included a blend of two low-viscosity amine curing agents that was then pre-reacted to achieve ~3000 cP (25° C.) with BPFDGE:

| Material | Approximate wt % |
| --- | --- |
| TTD Diamine | 51 |
| TCD Diamine | 17 |
| Epon862 | 32 |

As shown in Table 1 below and FIGS. 5-7, the composition of Example 3 was shown to reduce edge ingress but achieve the same photo-enhancement relative to the composition described in Example 2.

Example 4

Example 4 described QDEF samples made with the same materials as Example 3, but at a different composition.

As shown in Table 1 below, higher amounts of TCD diamine in Part B exhibited greater photo-enhancement/color shift; edge ingress was reduced relative to the composition described in Example 1.

Example 5

Example 5 described QDEF samples made with the same materials as Example 3, but at a different composition. As shown in Table 1 below, lower amounts of TCD diamine in Part B exhibited the same amount of photo-enhancement as the composition described in Example 1, but did not show as significant of a reduction of edge ingress as Example 3.

Example 6

Example 6 described QDEF samples made by chain-extending amines with BPADGE (Epon828) rather than BPFDGE (Epon862).

As shown in Table 1 below, edge ingress increased relative to the composition in Examples 2 and 3.

TABLE 1

| Materials | Edge Ingress (mm) (65/95, 500 hours) | Edge Ingress (85° C., 500 hours) | d(x, y) (85° C., 100 hours) | d(x, y) active device (100 hours) |
|---|---|---|---|---|
| Example 1 (Standard) | 1.2 | 1.0 | 0.002 | 0.005 |
| Example 2 - (TCD-diamine/ BPFDGE) | 0.4 | 0.3 | 0.010 | 0.012 |
| Example 3 (3/1 TTD/TCD Blend) | 0.6 | 0.4 | 0.002 | 0.006 |
| Example 4 (1/1 TTD/TCD Blend) | 0.5 | 0.4 | 0.008 | 0.010 |
| Example 5 (5/1 TTD/TCD Blend) | 0.8 | 0.5 | 0.002 | Not measured |
| Example 6 (BPADGE with 3/1 TTD/TCD Blend) | 1.0 | 0.9 | 0.002 | Not measured |

Figure 5:
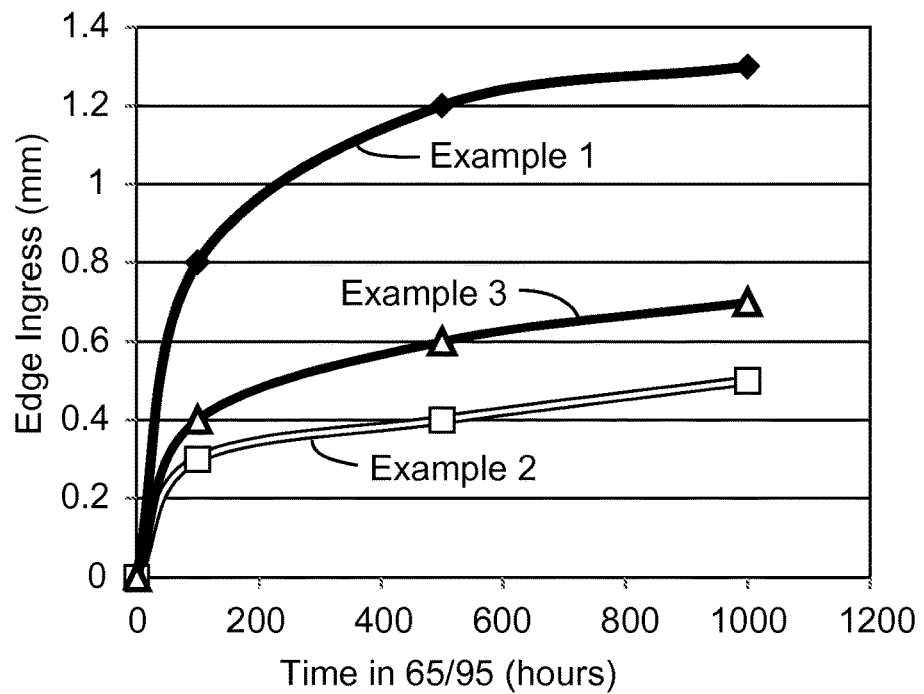
FIG. 5 is a plot of edge ingress vs. time after aging in a 65° C./95% RH environment for the matrix formulations of Examples 1-3.
Figure 6:
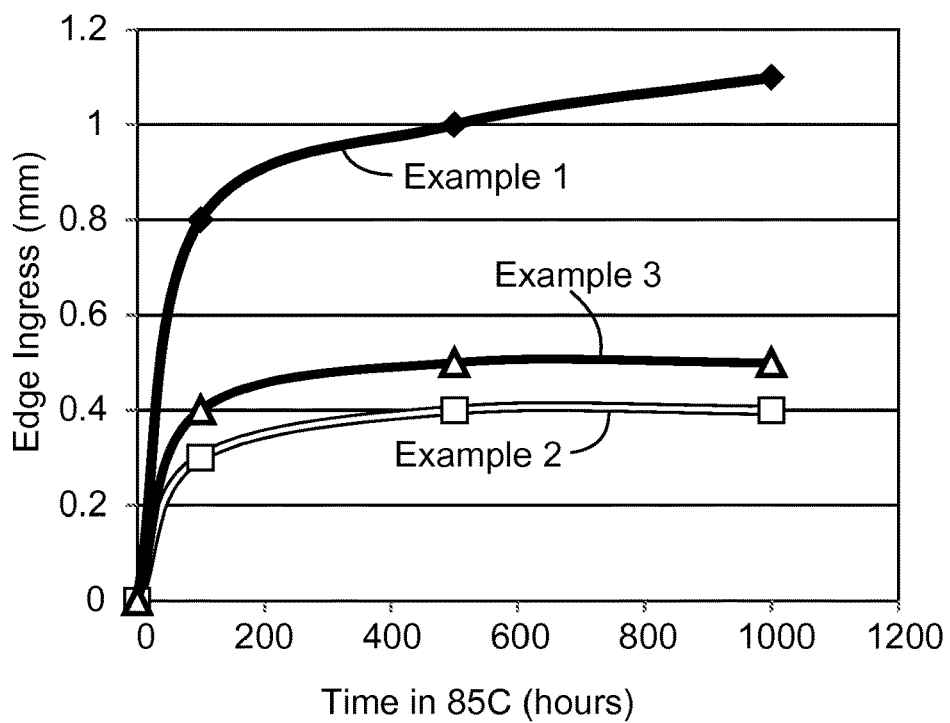
FIG. 6 is a plot of edge ingress vs. time after aging in an 85° C. environment for the matrix formulations of Examples 1-3.
Figure 7:
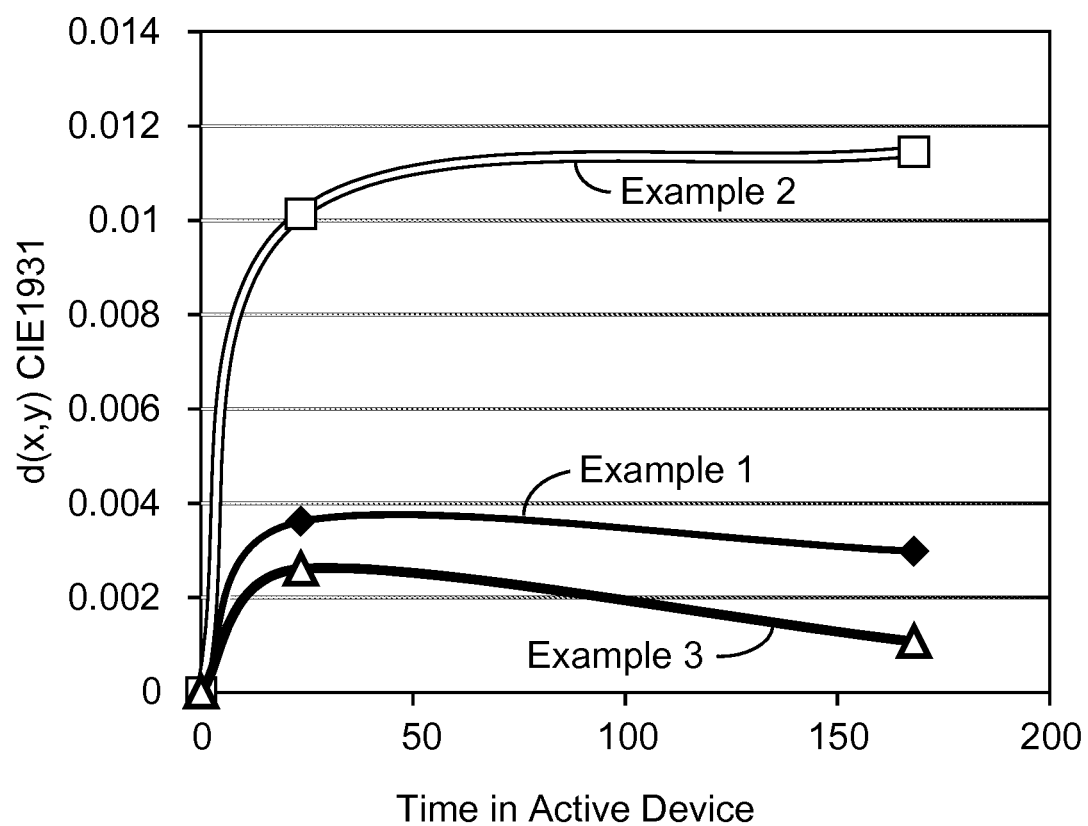
FIG. 7 is a plot of color shift vs. time in an active device for the matrix formulations of Examples 1-3.

FIGS. 5-7 plot the results shown in Table 1 for Examples 1-3. FIGS. 5-7 illustrate that while the films made from the composition of Example 2 have slightly better edge ingress than the films made from the compositions of Examples 1 and 3, the films of Examples 1 and 3 have less color shift than the films of Example 2. On balance, the films of Examples 1 and 3 can provide an improved balance of properties for use in a display of a mobile phone, tablet computer or television.

Various embodiments of the invention have been described. These and other embodiments are within the scope of the following claims.

The invention claimed is:

1. A quantum dot film article comprising:
a first barrier layer;
a second barrier layer; and
a quantum dot layer between the first barrier layer and the second barrier layer, the quantum dot layer comprising quantum dots dispersed in a matrix comprising a cured adhesive composition, wherein the adhesive composition comprises:
an epoxide;
a curing agent comprising:
(a) a compound of Formula I:

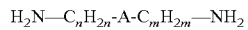
$$H_2N-C_nH_{2n}-A-C_mH_{2m}-NH_2 \quad \text{Formula 1}$$

wherein A is a monocyclic or a polycyclic alkylene group, or a monocyclic or a polycyclic heteroalkylene group, and m and n are integers each independently selected from 0 to 5; and
(b) a polyether amine compound of Formula V or VI:

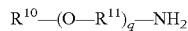
$$R^{10}-(O-R^{11})_q-NH_2 \quad \text{Formula V}$$

wherein, in Formula V, group $R^{10}$ is an alkyl having 1 to 4 carbon atoms, and $R^{11}$ is independently a branched or linear alkylene having 1 to 4 carbon atoms, and q is equal to at least 2

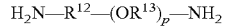
$$H_2N-R^{12}-(OR^{13})_p-NH_2 \quad \text{Formula VI}$$

wherein, in Formula VI, $R^{12}$ and $R^{13}$ are each independently a branched or linear alkylene having 1 to 4 carbon atoms, and p is equal to at least 2; and
a radiation curable methacrylate compound.

2. The film article of claim 1, wherein the epoxide comprises a bisphenol-F backbone.

3. The film article of claim 1, wherein the epoxide is a diepoxide.

4. The film article of claim 1, wherein A in Formula I is the group of Formula II:

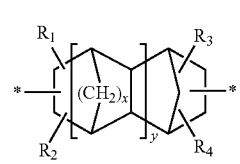

Formula II wherein $R_1$, $R_2$, $R_3$, and $R_4$, each represent either a hydrogen atom or a methyl group; x and y are each independently selected from 0 or 1; and the asterisks (*) represent attachment positions to Formula I.

5. The film article of claim 1, wherein A in Formula I is the group of Formula III:

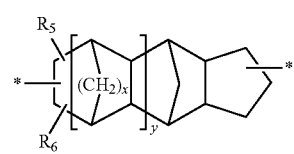

Formula III wherein $R_5$ and $R_6$ each represent either a hydrogen or a methyl group; x and y are each independently selected from 0 or 1, and the asterisks (*) represent the attachment positions to Formula I.

6. The film article of claim 1, wherein the compound of Formula I is represented by one of the following:
(a) 3(or 4), 8(or 9)-diaminomethyltricyclo(5,2,1,0$^{2.6}$) decane:

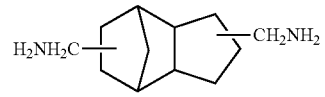

(b) 4,9(or 10)-diaminomethyltetracyclo(6,2,1,1$^{3.6}$,0$^{2.7}$) dodecane:

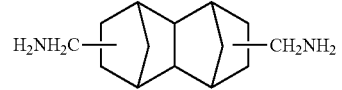

or, (c) 2,5(or 6)-diaminomethyl bicyclo(2,2,1)heptane:

7. The film article of claim 1, wherein the adhesive composition further comprises a photoinitiator.

8. The film article of claim 1, wherein the polyether backbone of the polyether amine compound comprises repeat units of propylene glycol (PG), ethylene glycol (EG), polytetramethylene glycol (PTMEG), and combinations thereof.

9. The film article of claim 1, wherein the polyether amine compound is 4,7,10-trioxatridecane-1,13,-diamine.

10. The film article of claim 1, wherein the ratio of the compound of Formula 1 to the polyether amine compound in the adhesive composition is about 1:1 to about 1:10 to about 10:1 to about 1:1.

11. The film article of claim 1, wherein the matrix comprises about 5 wt % to about 25 wt % of the methacrylate compound and 70 to 90 wt % of an epoxy polymer formed from the reaction of the epoxide and the curing agent.

12. The film article of claim 1, wherein the stoichiometric ratio of epoxy to amine in the curing agent is about 0.6 to about 1.4 epoxy to amine hydrogen.

13. The film article of claim 1, wherein the matrix further comprises scattering particles having an average size in a range from 1 to 10 micrometers.

14. The film article of claim 1, wherein at least one of the first and the second barrier layer comprises at least one polymeric film.

15. The film article of claim 1, wherein the matrix has a moisture and oxygen ingress of less than about 0.5 mm after 500 hours at 85° C.

16. The film article of claim 1, wherein the matrix has a color shift d(x,y) using the CIE1931 (x,y) convention of less than about 0.02 after 100 hours at 85° C.

17. The film article of claim 16, wherein the matrix has a color change d(x,y) using the CIE 1931 (x,y) convention of less than about 0.005 after 100 hours at 85° C.

18. A display device comprising the film article of claim 1.

19. A method of forming a film article, comprising coating a quantum dot material on a first polymeric film, the quantum dot material comprising quantum dots in an adhesive composition comprising:
an epoxide;
a curing agent comprising:
(a) an amino-functional compound of Formula I:

$$H_2N-C_nH_{2n}\text{-}A\text{-}C_mH_{2m}-NH_2 \qquad \text{Formula I}$$

wherein A is a monocyclic or a polycyclic alkylene group, or a monocyclic or a polycyclic heteroalkylene group, and m and n are integers each independently selected from 0 to 5; and
(b) a polyether diamine compound comprising at least one of primary and secondary amino groups attached to a polyether backbone, wherein the backbone comprises repeat units of propylene glycol (PG), ethylene glycol (EG), polytetramethylene glycol (PTMEG), and combinations thereof;
a radiation curable methacrylate compound; and
a photoinitiator.

20. The method of claim 19, further comprising curing the adhesive composition.

21. The method of claim 20, further comprising applying a second polymeric film on the adhesive composition.

22. The method of claim 21, further comprising curing the adhesive composition.

23. The method of claim 19, wherein the adhesive composition is cured by applying to the composition heat and UV light.

24. The method of claim 19, wherein the polyether diamine compound is represented by Formula VI:

$$H_2N-R^{12}-(OR^{13})_p-NH_2 \qquad \text{Formula VI}$$

wherein, in Formula VI, $R^{12}$ and $R^{13}$ are each independently a branched or linear alkylene having 1 to 4 carbon atoms, and p is equal to at least 2.

25. The method of claim 24, wherein the polyether diamine compound is 4,7,10-trioxatridecane-1,13,-diamine.

26. The method of claim 19, wherein the stoichiometric ratio of epoxy to amine in the curing agent is about 0.6 to about 1.4 epoxy to amine hydrogen.

27. An adhesive composition, comprising:
an epoxide;
a curing agent comprising:
(a) an amino-functional compound of Formula I:

$$H_2N-C_nH_{2n}\text{-}A\text{-}C_mH_{2m}-NH_2 \qquad \text{Formula I}$$

wherein A is a monocyclic or a polycyclic alkylene group, or a monocyclic or a polycyclic heteroalkylene group, and m and n are integers each independently selected from 0 to 5 and
(b) a polyether diamine compound represented by Formula VI:

$$H_2N-R^{12}-(OR^{13})_p-NH_2 \qquad \text{Formula VI}$$

wherein, in Formula VI, $R^{12}$ and $R^{13}$ are each independently a branched or linear alkylene having 1 to 4 carbon atoms, and p is equal to at least 2;
a radiation curable methacrylate compound;
a photoinitiator; and
quantum dots.

28. An adhesive composition, comprising:
an epoxide;
a curing agent comprising a blend of:
(a) an amino-functional compound of Formula I:

$$H_2N-C_nH_{2n}\text{-}A\text{-}C_mH_{2m}-NH_2 \qquad \text{Formula I}$$

wherein A is a monocyclic or a polycyclic alkylene group, or a monocyclic or a polycyclic heteroalkylene group, and m and n are integers each independently selected from 0 to 5; and
(b) a polyether diamine compound represented by Formula VI:

$$H_2N-R^{12}-(OR^{13})_p-NH_2 \qquad \text{Formula VI}$$

wherein, in Formula VI, $R^{12}$ and $R^{13}$ are each independently a branched or linear alkylene having 1 to 4 carbon atoms, and p is equal to at least 2;
a photoinitiator; and
quantum dots.

* * * * *

UNITED STATES PATENT AND TRADEMARK OFFICE
CERTIFICATE OF CORRECTION

PATENT NO. : 10,167,417 B2
APPLICATION NO. : 15/323661
DATED : January 1, 2019
INVENTOR(S) : Joseph Pieper Page 1 of 1

It is certified that error appears in the above-identified patent and that said Letters Patent is hereby corrected as shown below:

In the Specification

Column 5,
Line 63, delete "alklyamino" and insert -- alkylamino --, therefor.

Signed and Sealed this
Seventeenth Day of December, 2019

Andrei Iancu
*Director of the United States Patent and Trademark Office*